Nov. 24, 1970                C. A. COLLINS ET AL            3,543,108
           SYSTEM FOR MEASURING THE TIME INTERVAL BETWEEN
                      TWO NON-REPETITIVE PULSES
                        Filed April 10, 1968

INVENTORS
CLIVE A. COLLINS
JERRY E. EVANS
PHILIPPE C. FUROIS
GEORGE H. LOWE

BY Sughrue, Rothwell, Mion, Zinn & Macpeak

ATTORNEYS

United States Patent Office 3,543,108
Patented Nov. 24, 1970

3,543,108
SYSTEM FOR MEASURING THE TIME INTERVAL BETWEEN TWO NON-REPETITIVE PULSES
Clive A. Collins, Poughkeepsie, Jerry E. Evans, Stormville, Philippe C. Furois, Fishkill, and George H. Lowe, Wappingers Falls, N.Y., assignors to International Business Machines Corporation, Armonk, N.Y., a corporation of New York
Filed Apr. 10, 1968, Ser. No. 720,261
Int. Cl. G04f 9/00
U.S. Cl. 324—189
8 Claims

ABSTRACT OF THE DISCLOSURE

A system for measuring the time interval between two transients or non-repetitive input pulses. The first input pulse is applied to a voltage level discriminator which triggers a coherent waveform generator when the input pulse exceeds the threshold level of the discriminator. The generator produces a single pulse which has the shape of a critically damped sinusoidal wave. This is in time coherence with the first input signal. The critically damped sinusoidal shaped pulse is applied to one input of a hybrid junction. In like manner, the second input pulse is fed to a voltage level discriminator and then to a second coherent waveform generator which produces a second time coherent pulse which is applied to the other input of the hybrid junction. The hybrid junction produces an output voltage whose maximum amplitude is a function of the time interval between the two input pulses. The maximum amplitude of the output voltage is stored by a stretch circuit and measured by a digital voltmeter calibrated in suitable time units, such as nanoseconds.

BACKGROUND OF THE INVENTION

Field of the invention

The invention relates to the field of measuring the time interval between two transient signals or non-repetitive pulses.

Description of the prior art

In one type of prior art system for measuring the time interval between two transients or non-repetitive pulses, voltage samples of each pulse are stored, then scanned in sequence and displayed on a low frequency oscilloscope from which the time the interval between the two pulses can be read.

In another type of system for measuring the time interval between transients, a high accuracy oscillator is turned on by the first transient and turned off by the second transient, and the cycles of the oscillator during the on period are counted to determine the time interval between the two transients.

In another prior art system, the two sequential pulses are coupled to the two inputs of a latch circuit which produces an output pulse whose width is equal to the time difference between the two input pulses. This output pulse is integrated and amplified to provide a DC voltage ouput proportional to the time interval between the two input pulses.

However, all of these prior art systems have relatively poor resolution and accuracy.

SUMMARY OF THE INVENTION

The present invention may be briefly summarized as an improved system for measuring the time interval between two transients or non-repetitive pulses of extremely short duration. The pulses are applied to a high speed analog algebraic summing means which produces an output voltage whose maximum amplitude is a function of the time interval between the two input pulses. This maximum amplitude is stretched or stored for a period of time sufficient to permit a voltage measuring device to measure this amplitude. The primary object of the invention is to accurately measure such time intervals as short as the sub-nanosecond range with an accuracy of one percent or better and with a resolution as high as one picosecond.

BRIEF DESCRIPTION OF THE PREFERRED EMBODIMENT

Figure 2:
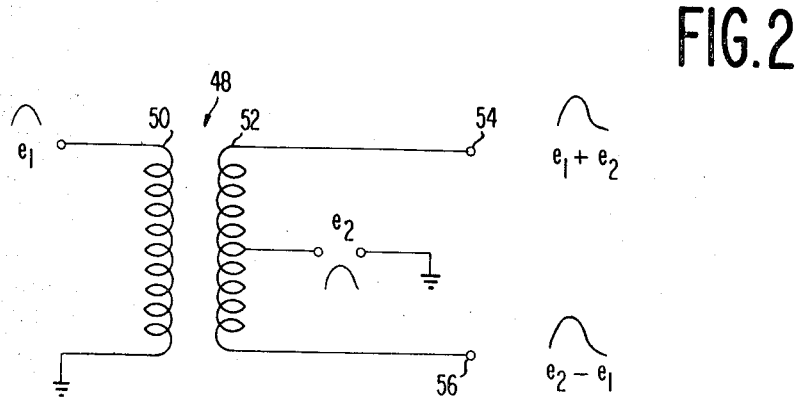
FIG. 2 is a schematic circuit diagram of the hybrid junction subtracting circuit of FIG. 1.

The preferred system consists of a first input terminal 10 connected to the input of a voltage level discriminator 12 whose output is connected to the input of a coherent waveform generator 14 whose output in turn is connected to one input 16 of a subtracting circuit 18 which in its preferred form is a wide band hybrid junction as illustrated in more detail in FIG. 2. In like manner, a second input terminal 20 is connected in series with another voltage level discriminator 22, a coherent waveform generator 24 and the second input 26 of the subtracting circuit 18. The output of circuit 18 is fed to a suitable detecting circuit, such as a stretch circuit 28, connected to a digital voltmeter 30.

In operation, a START transient pulse 32 is applied to the input of voltage level discriminator 12 which produces a step output pulse 34 of approximately 0.5 volt amplitude when its threshold level is exceeded by the amplitude of pulse 32. Pulse 34 then triggers coherent waveform generator 14 to produce a critically damped sinusoidal shaped pulse 36 having a peak amplitude on the order of 9 volts. Pulse 36 is applied to input 16 of the analog voltage subtracting circuit 18.

In a like manner, a STOP transient pulse 38, following start pulse 32, is applied to terminal 20 and voltage level discriminator 22 to produce a stepped pulse 40 of approximately 0.5 volt amplitude. Pulse 40 is applied to coherent waveform generator 24 which produces a critically damped sinusoidal shaped pulse signal 42 having an amplitude identical to the amplitude of signal 36. Subtracting circuit 18 produces an output waveform 44 whose maximum positive amplitude is proportional to the time interval between pulse signals 36 and 42. For example, if signals 36 and 42 are coincident in time, the amplitude of waveform 44 is zero or some other reference value. If the time interval between pulses 36 and 42 is the maximum measurable by the system i.e., a half pulse width or the rise time to the 9 volt maximum, then the maximum amplitude of waveform 44 is approximately 9 volts less 3 db.

Signal 44 is applied to stretch circuit 28 containing a capacitor (not shown) which is charged to the maximum positive amplitude of signal 44. The capacitor is designed to have a fast charge time but a slow discharge time so that the maximum voltage is held long to permit digital voltmeter 30 to measure the maximum amplitude of the signal.

The voltage level discriminators 12 and 22 may each be a tunnel diode monostable circuit driving a tunnel diode bistable circuit. A DC bias applied to the monostable circuit determines the threshold level of the discriminator.

Each coherent waveform genrator arrangment is a passive circuit, such as an LC circuit which is shock excited by the step pulse from the discriminator to produce a critically damped sinusoidal shaped pulse which is fed to subtracting circuit 18.

The subtracting circuit is also a passive circuit and in its preferred form is a wide band hybrid junction the equivalent circuit of which is as illustrated in FIG. 2. It consists of a transformer 48 consisting of a primary winding 50 and a center tapped secondary winding 52 having output terminals 54 and 56 at opposite ends thereof. In order to explain the operation of this hybrid junction, assume that the voltage signal $e_1$ corresponding to pulse 42 is applied across the primary 50, and a second voltage signal $e_2$ corresponding to pulse 36 is applied to the center tap of the secondary 52. The output voltage between terminal 56 and ground is then equal to $e_2-e_1$, and the output voltage between terminal 54 and ground is equal to $e_1+e_2$. In the preferred forms of this invention, only the output of terminal 56 is used, and this output corresponds to the voltage waveform 44 whose maximum amplitude is proportional to the difference in time between the two signals 36 and 42. Of course, the output signal at terminal 54 could also be used since $e_1+e_2$ is also proportional to the time difference.

Figure 1:
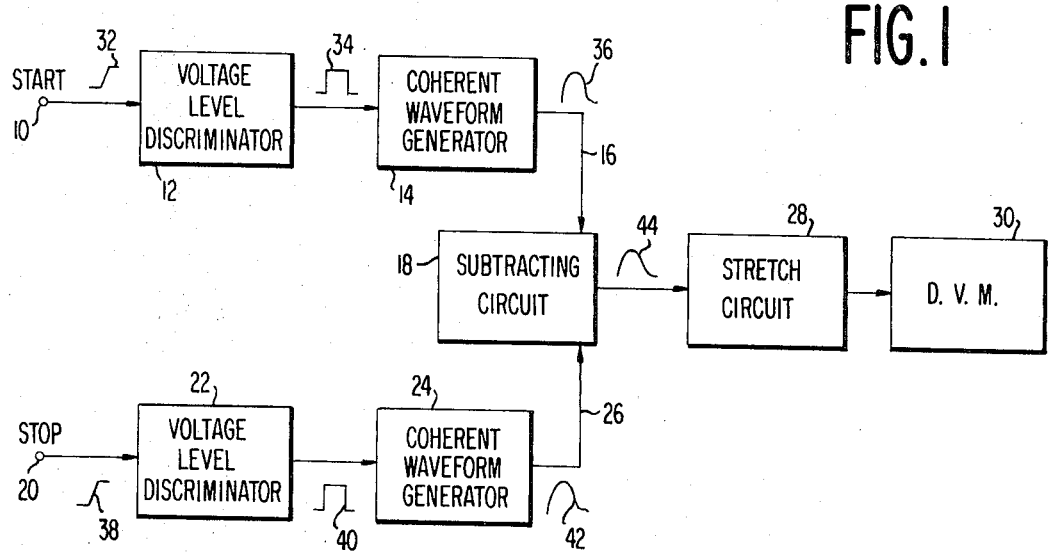
FIG. 1 is a block diagram of a preferred embodiment of the invention.

The circuit of FIG. 1 will accurately measure a time interval from 0 to 10 nanoseconds with a resolution of 1 picosecond and stability of ±10 picoseconds. The only limitation on the measuring capability of the circuit is that the time interval does not exceed the rise time of the signals 36 and 42. For example, if the rise time from 0 to the maximum of 9 volts of pulses 36 and 42 is 10 nanoseconds, then the maximum interval that can be measured between pulses 36 and 42 is 10 nanoseconds.

Stretch circuit 28 is conventional and consists of a diode and a capacitor. The diode is poled to permit the positive portion of signal 44 to pass therethrough and charge the capacitor to a voltage proportional to the maximum positive amplitude of signal 44. The capacitor holds this voltage for a time sufficient to permit the digital voltmeter 30 to measure the voltage. The digital voltmeter is calibrated in suitable units of time. In a circuit that has actually been built, time intervals from 0 to 1 microsecond can be measured in three ranges. In the 10 nanoseconds full scale range, the resolution is 1 picosecond. In the 100 nanosecond full range scale, the resolution is 10 picoseconds, and in the 1 microsecond full scale range, the resolution is 100 picoseconds.

While the invention has been particularly shown and described with reference to a preferred embodiment thereof, it will be understood by those skilled in the art that various changes in form and details may be made therein without departing from the spirit and scope of the invention.

What is claimed is:

1. A system for determining the time interval between two non-repetitive input pulses comprising:
    (a) a first input terminal for receiving a first non-repetitive input pulse,
    (b) a second input terminal for receiving a second nonrepetitive input pulse,
    (c) a first non-repetitive passive generating means coupled to said first input terminal for generating a first non-repetitive single sinusoidal-shaped pulse in phase with said first input pulse.
    (d) a second non-repetitive passive generating means coupled to said second input terminal for generating a second non-repetitive single sinusoidal-shaped pulse in the phase with said second input pulse,
    (e) said sinusoidal-shaped pulses each having a rise time at least equal to the time interval between said first and second non-repetitive input pulses, and
    (f) passive algebraic summing means responsive to said first and second sinusoidal-shaped pulses for producing an output signal proportional to the algebraic sum of said sinusoidal-shaped pulses, the amplitude of said output signal thereby representing the time interval between said first and second non-repetitive input pulses.

2. A system as defined in claim 1 further comprising means coupled to said passive summing means for detecting said output signal.

3. A system as defined in claim 2 wherein said detecting means comprises:
    (a) means for storing the peak amplitude of said output signal, and
    (b) means connected to said storing means for measuring said peak amplitude.

4. A system as defined in claim 1 wherein said first and second non-repetitive passive generating means are first and second LC circuits, respectively.

5. A system as defined in claim 8 further comprising input pulse level discriminator means connected between each of said input terminals and a corresponding LC circuit for producing a step voltage to shock excite said corresponding LC circuit to produce a single non-repetitive critically damped sinusoidal-shaped pulse.

6. A system as defined in claim 5 wherein said passive algebraic summing means comprises a hybrid junction.

7. A system as defined in claim 6 wherein both of the critically damped sinusoid-shaped pulses are of the same polarity, and said hybrid junction is connected to produce an output signal proportional to the difference between said critically damped sinusoid-shaped pulses.

8. A system as defined in claim 1 wherein said passive algebraic summing means comprises a hybrid junction.

References Cited
UNITED STATES PATENTS

| | | | |
|---|---|---|---|
| 3,008,137 | 11/1961 | Schneider | 324—68 X |
| 3,375,517 | 3/1968 | Rodgers et al. | 324—83 X |
| 3,013,224 | 12/1961 | King | 333—18 |

ALFRED E. SMITH, Primary Examiner

UNITED STATES PATENT OFFICE
CERTIFICATE OF CORRECTION

Patent No. 3,543,108                    Dated November 24, 1970

Inventor(s)   Clive A. Collins et al

It is certified that error appears in the above-identified patent and that said Letters Patent are hereby corrected as shown below:

Column 1, line 47  -  Delete "the" between "time" and "interval"

Column 4, line 31  -  "in claim 8" should be "in claim 4

SIGNED AND
SEALED
MAR 9 1971

(SEAL)
Attest:

Edward M. Fletcher, Jr.
Attesting Officer

WILLIAM E. SCHUYLER, JR.
Commissioner of Patents